No. 784,484. PATENTED MAR. 7, 1905.
F. FREDEEN.
BAND CUTTER AND FEEDER FOR THRESHING MACHINES.
APPLICATION FILED MAY 5, 1903.
4 SHEETS—SHEET 1.
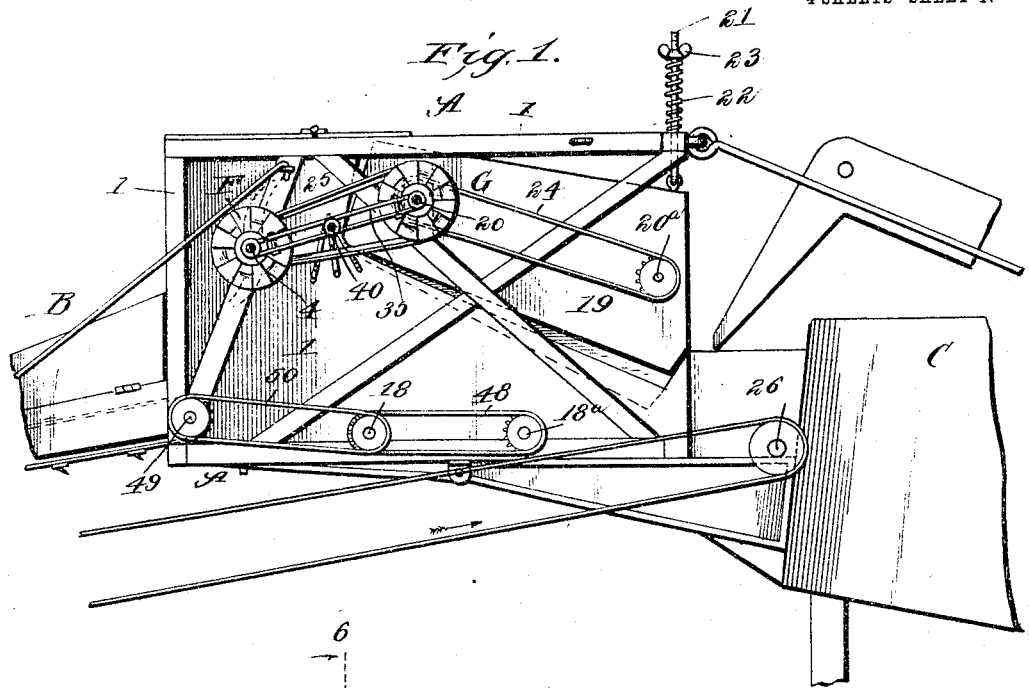
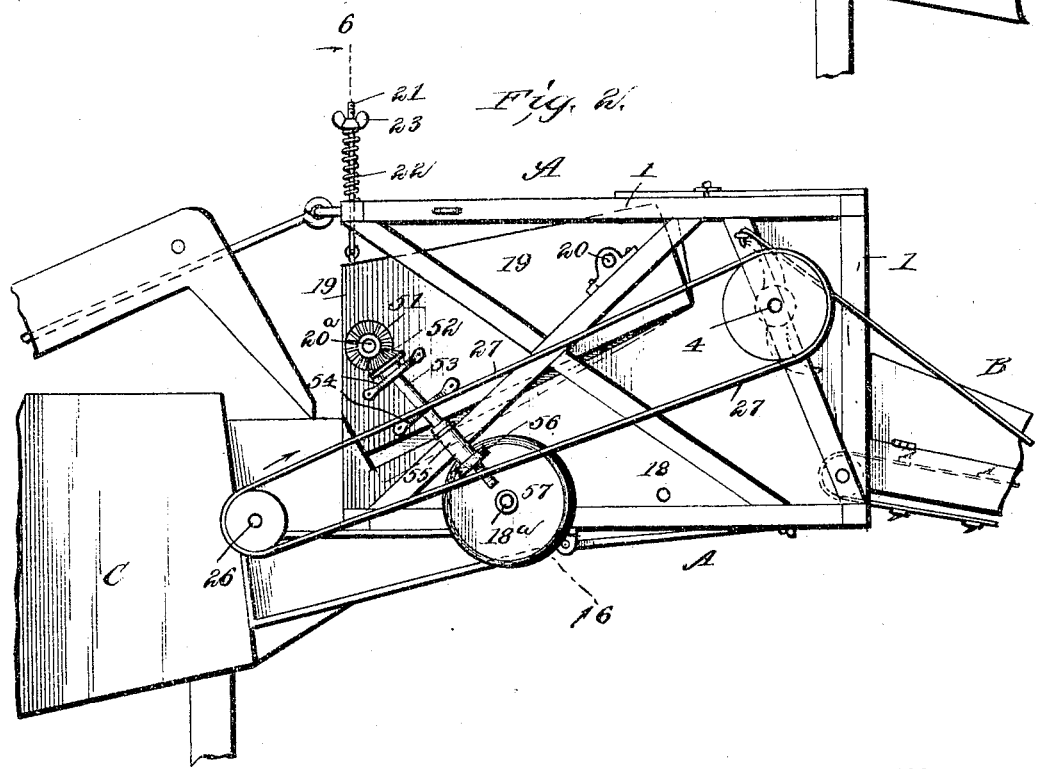
WITNESSES
Fred D Bratford
Amos W Hart
INVENTOR
Frank Fredeen
BY Munn & Co.
ATTORNEYS.

No. 784,484. PATENTED MAR. 7, 1905.
F. FREDEEN.
BAND CUTTER AND FEEDER FOR THRESHING MACHINES.
APPLICATION FILED MAY 5, 1903.
4 SHEETS—SHEET 2.
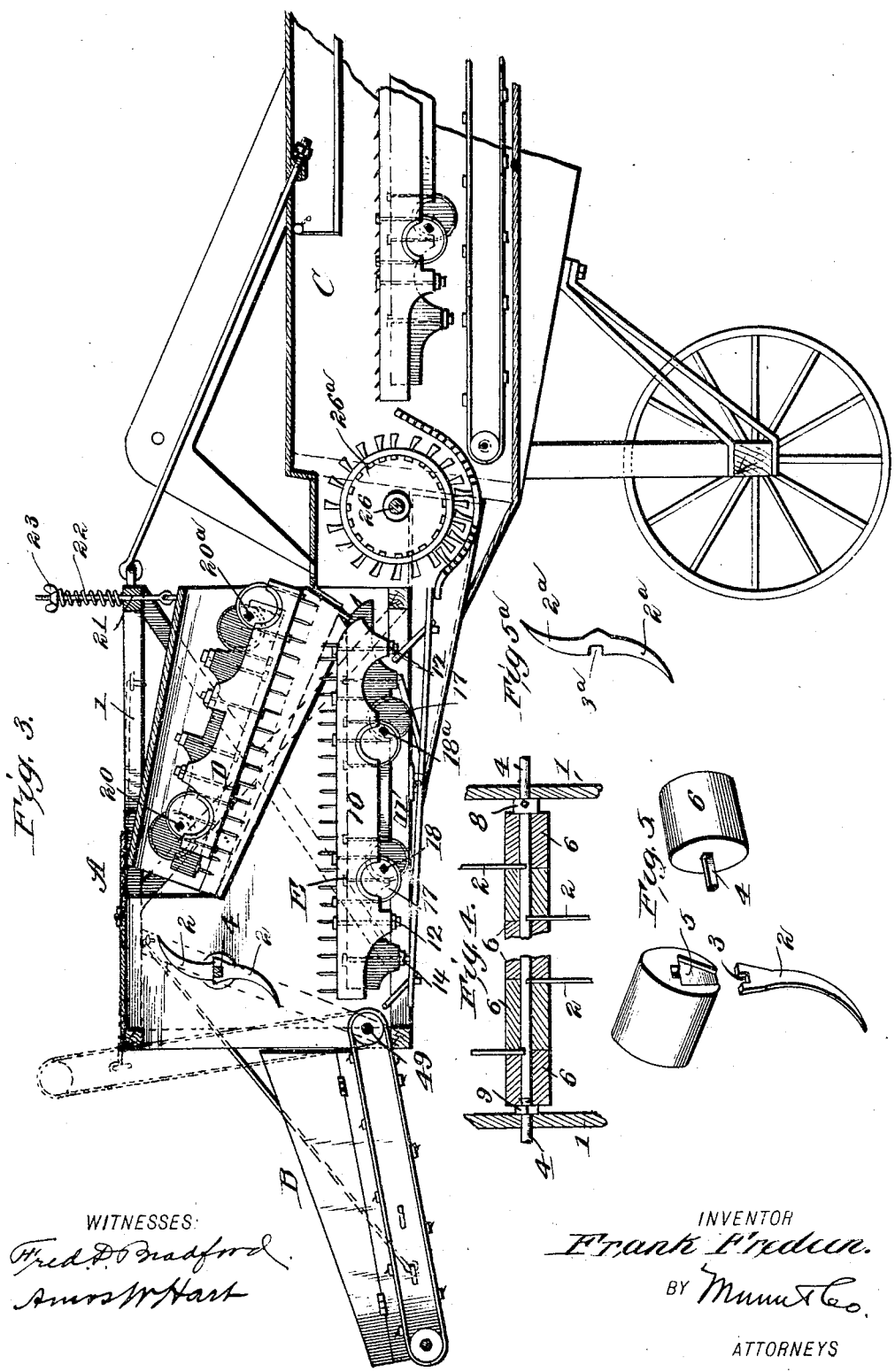
WITNESSES:
Fred. D. Bradford
Amos W. Hart
INVENTOR
Frank Fredeen.
BY Munn & Co.
ATTORNEYS

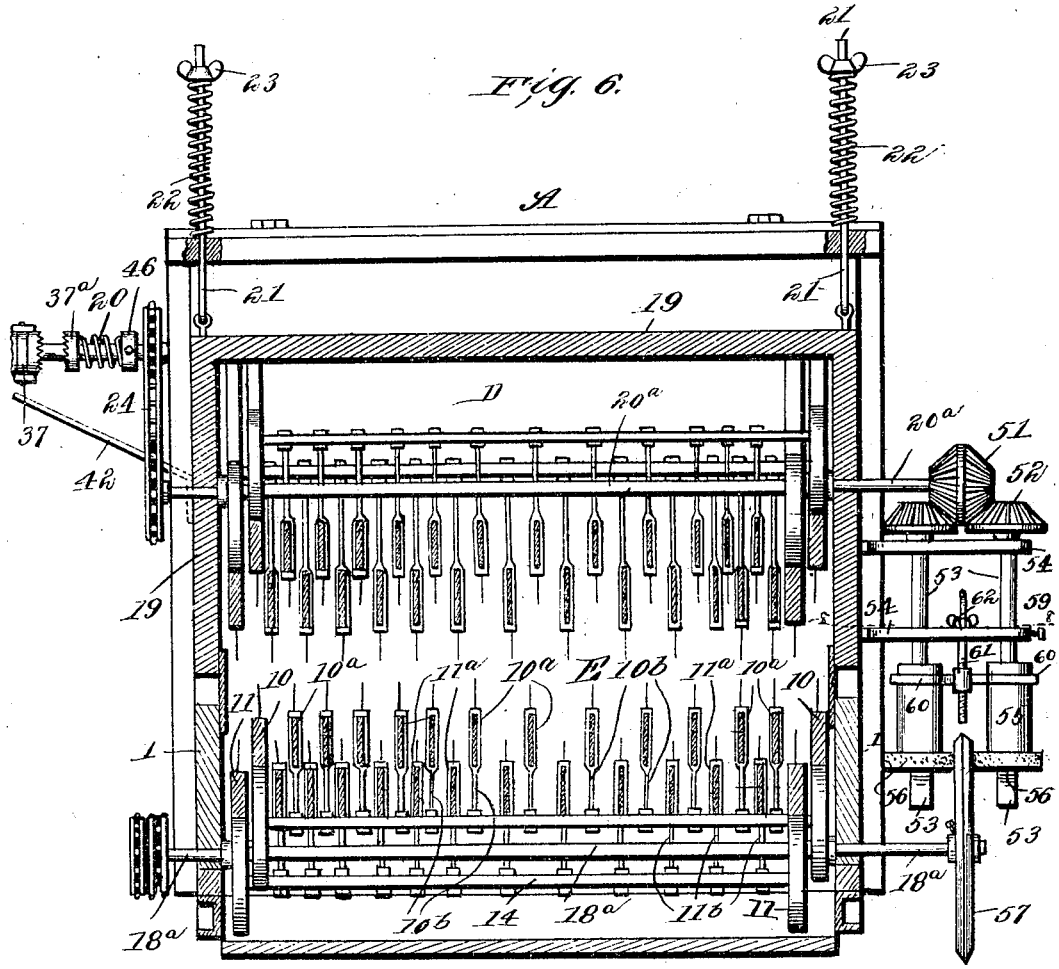
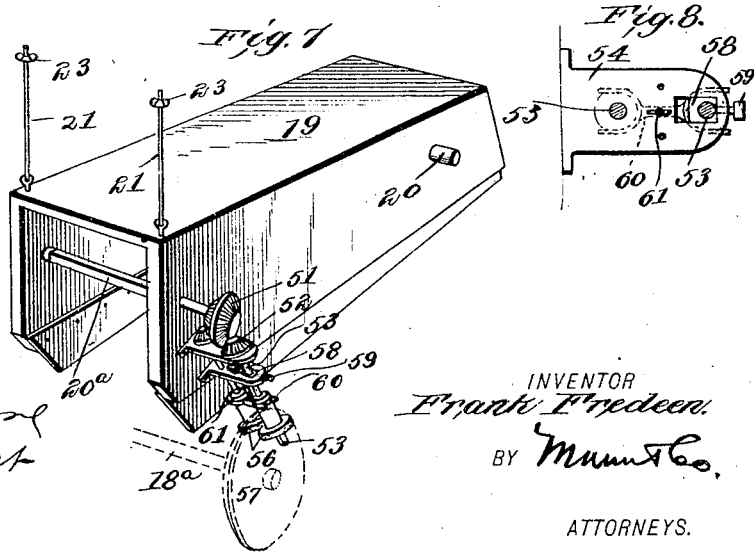

No. 784,484. PATENTED MAR. 7, 1905.
F. FREDEEN.
BAND CUTTER AND FEEDER FOR THRESHING MACHINES.
APPLICATION FILED MAY 5, 1903.
4 SHEETS—SHEET 4.

WITNESSES:

INVENTOR
Frank Fredeen.
BY Munn & Co.
ATTORNEYS.

No. 784,484.

Patented March 7, 1905.

UNITED STATES PATENT OFFICE.

FRANK FREDEEN, OF TAYLORS FALLS, MINNESOTA.

BAND-CUTTER AND FEEDER FOR THRESHING-MACHINES.

SPECIFICATION forming part of Letters Patent No. 784,484, dated March 7, 1905.

Application filed May 5, 1903. Serial No. 155,734.

*To all whom it may concern:*

Be it known that I, FRANK FREDEEN, a citizen of the United States, residing at Taylors Falls, in the county of Chisago and State of Minnesota, have made certain new and useful Improvements in Band-Cutters and Feeders for Threshing-Machines, of which the following is a specification.

In respect to one of its features my invention is an improvement in that class of attachments for threshing-machines in which the feed or advance of the grain to the threshing-cylinder is automatically regulated and kept practically uniform by a governor, preferably by one comprising a friction-wheel variably rotating in contact with a disk upon whose face it is radially, automatically, and variably adjustable for producing fast or slow speed. The operation of the rakes or means for feeding the grain is thus governed automatically according to the quantity and condition of the grain.

My invention includes various novel features of construction, arrangement, and combination of parts, as hereinafter set forth and claimed.

Figure 9:
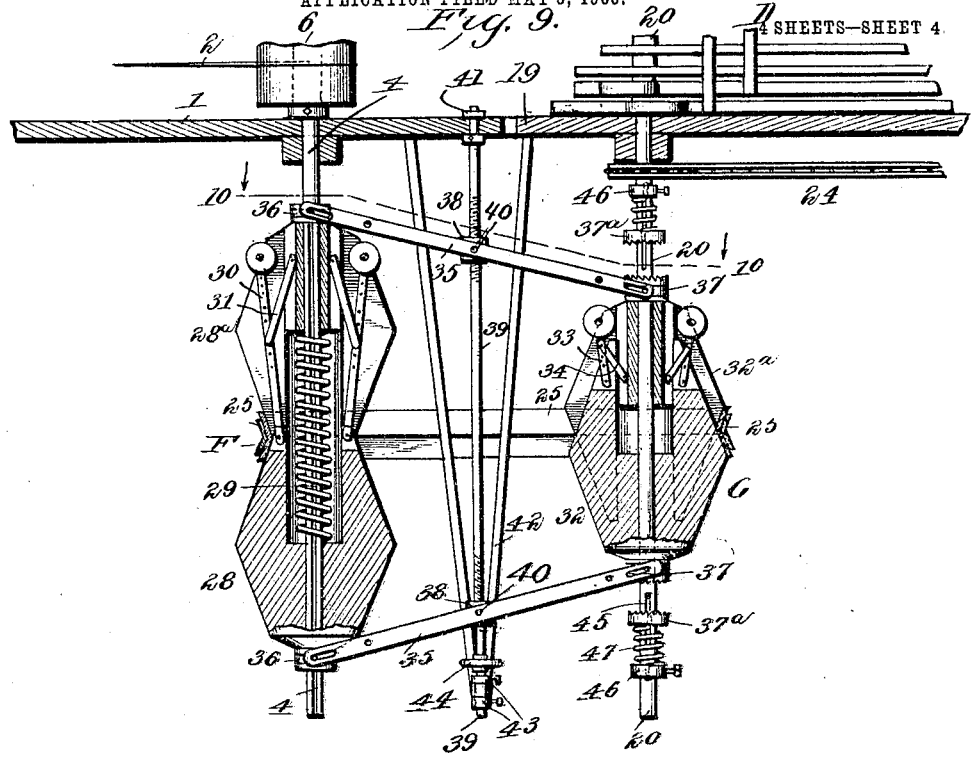
Figure 10:
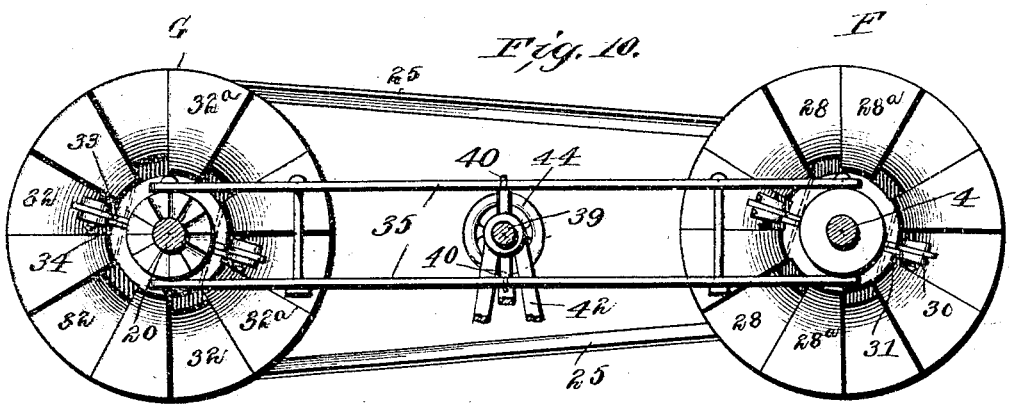
Figure 11:
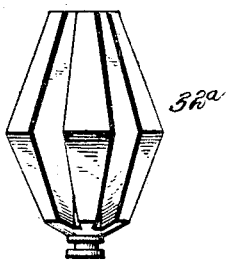

In the accompanying drawings, Figure 1 is a side elevation of my improved band-cutter and feeder attachment together with a portion of a threshing-machine to which it is detachably secured. Fig. 2 is an elevation of the opposite side of the parts shown in Fig. 1. Fig. 3 is a vertical longitudinal section of the band-cutter and feeder together with the usual grain-conveyer and a portion of a thresher. Fig. 4 is a partly-sectional detail view illustrating the attachment of the knives or cutters of the band-cutter to the rotary shaft. Fig. 5 is a perspective view of certain parts of the band-cutter detached for better illustration of the construction and arrangement of parts. Fig. 5ª is a view representing a modification in the attachment of the knives of the band-cutter. Fig. 6 is an enlarged vertical transverse section of the machine on the line 6 6 of Fig. 2. Fig. 7 is a perspective view of the hood or box-like frame in which the upper jaw of the feeder is inclosed. Fig. 8 is a horizontal section on the line 8 8 of Fig. 6. Fig. 9 is a sectional view of the parts composing the automatic governor. Fig. 10 is an enlarged cross-section on the line 10 10 of Fig. 9. Fig. 11 is a plan view of a cone of an expansible pulley forming part of the automatic governor.

As indicated in Figs. 1, 2, and 3, A indicates my improved band-cutter and feeder, which is interposed between the conveyer B and thresher C. The conveyer and thresher may be constructed in the usual or any preferred manner; but I prefer to employ in the feeder proper an improved rake-and-beater mechanism which forms the subject of a separate application. The band-cutter and feeder is detachably secured to the thresher C in the usual or any approved manner, and the conveyer B is similarly attached to the front of the band-cutter and feeder. As shown in Fig. 3, the conveyer B is provided with an endless traveling belt upon which the grain is deposited and by which it is carried forward beneath the band-cutter proper. The latter, as illustrated in Figs. 3, 4, and 5, is formed of a series of curved or similar blades 2, whose upper ends are enlarged or dovetailed and provided with notches 3. These notches are adapted to fit upon or receive the one side of the polygonal shaft 4, and the heads of the cutters are adapted to fit in dovetail recesses 5, formed in one of the ends of collars or sleeves 6, mounted upon the shaft 4. The collars may have a different cross-section, and I propose to employ any with which the cutters or knives may be adapted to engage. It will be seen in Fig. 4 that the heads of the cutters 2 will lie flush with the end of the collars or sleeves 6, in whose recesses they are adapted to fit. Thus there is no space between such collar or sleeve and the adjacent one when the parts are adjusted as shown in Fig. 4. It will be understood that the shaft 4 is polygonal or feathered only in that portion which extends between the inner sides of the casing 1, the remaining portions of the shaft being cylindrical and arranged in suitable boxes in the side of the casing and also extended beyond the same for a purpose that will be presently explained. As indicated in Fig. 4, the shaft is provided at one end with a collar 8, which may be secured in any suitable manner, and at the opposite end with a nut 9, the shaft being threaded at that point to allow due adjustment of the latter. It will be seen that by adjustment of the nut 9 the several sleeves or collars 6 may be clamped tightly together, so as to hold the knives 2 securely, and that the latter are prevented from detachment for that reason and also by the dovetail form of the heads. It is apparent that this construction enables the knives to be easily and quickly detached when required for sharpening or for other purpose.

In Fig. 5$^a$ I illustrate a modification in which two knives or cutters 2$^a$ are formed as one, the central portion being enlarged or widened and provided with a lateral notch 3$^a$, adapted to engage the shaft 4 in practically the same manner as the knives 2, before described. It will be understood that one end of each sleeve or collar 6 is to be provided with a recess conforming to the enlargement of the central portion of the knife 2$^a$, so that when the collars are clamped together, as before described, the knife will be held securely, and that when when the collars are loosened by adjustment of the nut 9 the knife may be detached laterally.

The feeder proper comprises upper and lower portions D and E, (see Fig. 3,) which for convenience of description I will hereinafter term "jaws." Each of the said jaws is composed of a series of longitudinally-toothed bars, and since these and other parts for operating them are practically the same it will suffice to describe one of them. As will be seen from Figs. 3 and 6, the lower jaw E is composed of two frames or sections, which are duplicates. One of such frames or sections consists of outer bars 10 and inner bars 10$^a$, the latter being smaller, as shown. The other or duplicate section is composed of outer bars 11 and inner bars 11$^a$. The two outer bars 10 and 10 are connected near each end by cross-bars 12, upon which are supported the vertical fingers or posts 10$^b$, carrying the smaller bars 10$^a$. Similarly, the other outer bars 11 are connected by cross-bars 14, which similarly carry and support fingers or posts 11$^b$, to which the smaller bars 11$^a$ are attached. It will be seen that all the bars are provided with teeth, which are preferably set vertically and extended to suitable length to engage and hold the grain. The bars are all arranged parallel and close together, and those 10 10$^a$ forming one of the frames alternate with those 11 11$^a$ constituting the other frame. These frames have an endwise and vertical movement, one rising as the other falls and one moving forward as the other moves rearward. The means for imparting this motion are eccentrics, which are arranged in pairs 17, there being four on each of the two rotary shafts 18 and 18$^a$, which extend through the sides of the casing 1 and are journaled in suitable boxes. As indicated in Fig. 3, the central portion of these shafts are square or otherwise made polygonal, and the eccentrics are arranged so that one of each pair projects in the direction opposite to the other, and one of them engages a suitable bearing in a side bar 10, while the adjacent eccentric similarly engages the adjacent side bar 11. It will be seen that the arrangement of the eccentrics is the same on both sides of the casing. The shafts 18 and 18$^a$, upon which the eccentrics are mounted, are rotated by means hereinafter described, so that the two frames, each comprising a set of toothed bars and connecting cross-bars 12 or 14, are alternately raised and lowered and moved forward and backward. The upper jaw D is similarly constructed, as heretofore stated, but is inverted in position, so that the teeth of the several bars project downward. Furthermore, the bars composing this jaw are arranged in a hood or box-like frame 19, (see Fig. 7,) and it, as well as the rake-bars, is pivoted upon the transverse shaft 20, the other or free ends of the hood and the rake-bars being adapted to swing vertically. The outer end of the hood 19 is elastically as well as adjustably supported by means of rods 21, (see Figs. 1, 2, 3, 6, 7,) spiral springs 22, and nuts 23, applied to the threaded upper portions of said rods. The rods pass through the upper front portion of the framing of the casing 1 and the springs encircle them. It is obvious that by adjusting the nuts 23 the tension of the springs may be regulated, and the hood 19, with its contained rakes or feeder mechanism, may be adjusted higher or lower, as conditions require. The said parts 21 22 23 also form an elastic support, which enables the hood, with its raking attachment, to rise and fall according to adjustment and the quantity or volume of grain being fed between the two jaws D and E.

The upper shaft 20 of the jaw D is rotatably connected with a shaft 20$^a$, (see Figs. 3 and 7,) which passes through the lower or outer end of the hood 19 by means of a chain 24 and suitable sprockets. (See Fig. 1.) The upper shaft 20 of the jaw D and the shaft 4 of the band-cutter are rotatably connected by means of a belt 25 and expansible pulleys F and G on shafts 4 and 20. (See Figs. 1, 9, and 10.) These parts—to wit, the belt 25 and expansible pulleys F and G, with their connections—constitute an automatic variable-speed governor whose construction and operation will be presently described. The band-cutter shaft 4 is extended laterally from the casing 1, as shown in Fig. 9, and the expansible pulley F is mounted thereon. This shaft 4 is driven from the shaft 26 of the threshing-cylinder by means of a belt or chain 27, (see Fig. 2,) the same being applied to suitable pulleys, as there shown. It is thus apparent that the speed of the band-cutter will always correspond to that of the cylinder.

The regulator or governor before referred to is illustrated in Figs. 1, 9, 10, and 11. I will first describe the pulley F. It is composed of two double cones 28 28ª, the adjacent ends of each being slotted longitudinally, thus forming fingers which are interposed and adapted to slide longitudinally. In other words, each of the fingers is fitted loosely and adapted to slide in a corresponding recess or groove formed between the fingers of the adjacent hub. The two double cones or hubs 28 28ª are keyed, but adapted to slide upon the feathered shaft 4. They are also recessed, as shown in Fig. 9, to provide space for a spiral compression-spring 29, which encircles the shaft, as shown. A centrifugal governor attachment is provided for this pulley F by means of bars 30, whose inner ends are pivoted to the inner end of the double cone or hub 28, and they extend in longitudinal slots provided in the adjacent hub 28ª. Weights are applied to the outer ends of the bars 30, and links 31 connect them with the hub 28ª, as shown. It is apparent that the rotation of the shaft 4 imparting like rotation to the compound pulley F the weighted arms 30 will be thrown out by centrifugal action to a degree corresponding to the speed of rotation, and such arms being connected with the two slidable parts 28 28ª they will be drawn together and the spring compressed to a degree corresponding with the speed of rotation. The other expansible pulley, G, is also formed of two double cones 32 32ª, having interlacing fingers; but they are free to rotate on the shaft 20 in place of being keyed thereto. They are likewise provided with a governor attachment, which is, however, so constructed and arranged as to tend to draw the hubs 32 32ª apart instead of together, as in the case of the pulley F—that is to say, bars or arms 33 are pivoted to the fingers of the hub 32 and provided at their outer ends with weights. Links 34 connect the said bars 33 with the hub 32ª; but it will be noted that the arrangement of these links 34 is the reverse of the links 31, before described in connection with the governor attachment of pulley F. In other words, the links 34 project inward instead of outward at an angle to the respective governor-bars. It therefore results that the effect of centrifugal action upon the pulley G is to draw the double cones or hubs 32 32ª asunder instead of toward each other. The belt 25 is preferably constructed in two parts or layers, the outer being narrower than the inner, as indicated in Fig. 9. The belt runs equally on the two adjacent conical portions of the two pulleys F G, and the latter are always expanded and contracted uniformly and relatively in such manner that the tension of the belt is uniform. The sections or hubs of the pulley F are operatively connected with those of the pulley G by means of two pairs of parallel levers or lever-arms 35 and collars 36 on the shaft 4 and clutch-collars 37 on the shaft 20. The collars 36 are to be connected with the cones of hubs 28 28ª, and the clutch-collars 37 require to be connected with the adjacent hubs 32 32ª in order that as the pulley F is expanded the hubs or cones of the pulley G may be drawn apart through the action of the levers 35. The ends of the latter are slotted, as shown in Fig. 9, to receive pins projecting from opposite sides of rings which are fitted rotatably in circumferential grooves of the respective collars 36 37. Such slots allow due play of the levers in connection with the collars. The fulcra of the levers 35 are nuts 38, which are applied to reversely-threaded portions of a shaft 39, arranged horizontally, as shown in Figs. 9 and 10. The said nuts 38 have trunnions 40 projecting from opposite sides (see Fig. 10) and serving as pivots for the pairs of levers 35.

The inner end of the threaded shaft 39 is journaled in the side of the casing 1, but held immovable longitudinally by means of collars 41. The outer end of said shaft is supported in the extremity of a bracket 42, which is also attached to and projects laterally from the side of the casing 1. (See Figs. 1 and 10.) Clamping-collars 43 (see Fig. 9) are applied to the shaft 39 on each side of the outer bearing for the same, and a hand-wheel 44 is keyed on the shaft adjacently for use in rotating the latter. It will be seen that by such rotation the nuts 38 will always be moved in opposite directions—that is to say, toward or from each other—and thus the distance between the fulcra of the opposite levers 35 will be changed accordingly. As before indicated, the expansible pulley F is keyed on the shaft 4, but is slidable thereon, while the opposite pulley G is both rotatable and slidable on its shaft 20. The clutch-collars 37 are adapted to engage corresponding collars 37ª, which are slidable on the shaft 20, but prevented from rotating thereon by means of a feather or spline 45. A collar 46 is clamped by a screw upon the shaft 20, exterior to the clutches 45, and a spiral spring 47 is interposed, the same being coiled around the shaft and likewise secured to the clutches 45 and collars 46 at its respective ends. It will be seen by inspection of Fig. 9 that when the band-cutter shaft 4 is driven at a low rate of speed the governor attachment of the pulley F will not be brought into action in such manner as to draw the cones of the pulley F together, and thus expand it, and consequently the clutches 37 37ª will not be brought together or engaged, and hence no rotation will be imparted from shaft 4 to shaft 20, and the rakes D will remain immovable. When, however, the speed of the threshing-cylinder 26ª reaches its normal degree, the band-cutter shaft 4 will be driven, through the medium of the belt 27, (see Fig. 2,) at a corresponding speed, and thereby the governor-arms 30 of pulley F will be thrown outward and the cones or hubs 28 28ª drawn together, or, in other words, the pulley F will be expanded, by which operation the levers 35 will be shifted on their fulcra so as to draw the hubs or cones of the opposite pulley G farther apart and bring the clutches 37 and 37ª into engagement. The instant that this is effected the shaft 20 will be rotated and the rakes of the upper jaw D driven with a rapidity corresponding to that of the threshing-cylinder 26ª.

It is apparent that by adjustment of the clamping-collars 46 on the shaft 20 the clutches 37ª may be moved nearer to or farther from the pulley G, and consequently the time when the clutches of the pulley will engage the clutches 37ª may be regulated at will. This adjustment will be made correspondingly to the condition of the grain to be threshed.

It will be noted in Fig. 9 that the arms 30 and 33 of the governor attachments of the respective pulleys F G are provided with a series of holes to permit adjustment of the points of connection between the arms and the links 31 34. The weights of the respective lever-arms will also be made adjustable thereon.

The rakes of the lower jaw E and also the endless belt of conveyer B are driven from the lower shaft 20ª of the upper jaw D. As represented in Fig. 1, the shafts 18 and 18ª of the lower jaw are operatively connected by a chain 48 running on sprockets, and the shaft 18 is in turn operatively connected with the shaft 49 of the endless belt of conveyer B (see Fig. 3) by means of a chain 50, which is duly applied to sprocket-wheels on the respective shafts. Thus whatever speed is communicated to the shaft 18ª of the lower jaw E will be similarly imparted to the counter-shaft 18 and the conveyer-shaft 49, so that the endless belt will always run with a speed uniformly relative to the movement of the rakes E. The shaft 18ª is driven from the lower shaft 20ª of the upper rake-jaw through the medium of bevel and friction gearing, as will now be described. Referring to Figs. 2, 6, 7, it will be seen that the outer end of shaft 20ª carries a double bevel-gear 51, which meshes with two corresponding bevel-gears 52 mounted on adjacent shafts 53. The latter are journaled in brackets 54, projecting from the side of the hood 19, and hubs 55 are applied to their lower ends, which are so formed in cross-section that the hubs rotate therewith while adapted for being adjusted longitudinally. The lower ends of the hubs 55 carry friction-faced driving-rollers 56, which work in frictional engagement with opposite sides of a bevel-edged friction-disk 57, that is keyed on the rake-shaft 18ª. As will be understood by reference to Fig. 8, the pressure of these rollers upon the faces of the disk 57 may be regulated by means of an adjustable bearing-block 58 and a set-screw 59—that is to say, the outer shaft 53 passes through the block 58, which is slidable in an elongated slot formed in the lower bracket 54, the screw 59 being arranged in the outer end of the same and bearing upon the block, as shown. The driving-rollers 56 may be adjusted on the shafts 53 so as to place them nearer to or farther from the axis of the driven disk 57, as conditions may require. For this purpose forks 60 are applied to the hubs 55 and held engaged therewith in such manner as to permit rotation of the hubs, and a screw-shaft 61 works in a central hub or nut arranged in the center of the fork 60 and passing through the lower bracket 54 and having a wing-head 62 applied to its upper end. By rotation of the head 62 it is obvious that the hubs may be adjusted longitudinally as required. This adjustment will be made according to the condition of the grain or the power of the motor driving the apparatus, and it is apparent that the speed of the lower rake relative to that of the threshing-cylinder 26ª will be increased when the friction-rollers 56 are adjusted nearer to the shaft 18 and will be reduced when the said rollers are adjusted outward near the periphery of the disk 57.

Recapitulating the operation of the machine, the speed of the band-cutter shaft 4 always corresponds directly with that of the threshing-cylinder 26ª. If the quantity of grain fed to the cylinder can be easily threshed by it, the cylinder will be driven at a relatively high rate of speed, and the weighted arms 30 of the expansible pulley F will be thrown out by centrifugal action and the two hubs or double cones of said pulley thereby forced toward each other against the tension of the spring 29. In brief, the pulley F will be expanded to or nearly to its full capacity and the opposite pulley G contracted and reduced correspondingly through the shifting of its weighted levers 33 on their fulcra. Owing to the differentiation in the size of the driving-pulley F and driven pulley G thus produced, the shafts 20 and 26ª of rake-jaws D and E will be driven at a relatively high rate of speed, so that the rakes will carry the grain rapidly forward. So long as the grain does not accumulate in excess beneath the lower end of the upper jaw D the latter remains in its normal or usual adjusted position, and the friction driving-rollers 56 consequently remain as adjusted at any part of disk or near the shaft or axis 18ª of the disk 57, whereby the latter is driven at great speed, as well as the counter-shaft, and the rakes of the lower jaw E are driven correspondingly fast, so that grain is fed rapidly from the under side of the bundles or mass between the jaws. The arrangement of parts is, however, such that the upper jaw-rakes work much faster that the lower ones, so that the grain is always fed more rapidly from the upper side than the under one. If the quantity of grain carried to the threshing-cylinder 26ª be so great or it be so wet and tangled that the speed of the cylinder is retarded, the band-cutter will necessarily be driven slower, and consequently also the shafts 20 and 20ª of the upper rakes D, for the reason that the weighted governor-arms of pulley F will not be thrown out so far by centrifugal action, and hence the pulley F will be expanded less and the pulley G expanded correspondingly. The rakes of the lower jaw E will then be driven slower, owing to reduction of the speed communicated from the lower shaft 20ª of the upper rakes through the medium of the friction-rollers 56 and friction-disk 57. In brief, when the speed and effective action of the cylinder 26ª are reduced those of the rakes or jaws D E are changed relatively, so that the grain is fed much more slowly and the cylinder is not overloaded to the extent that would otherwise be the case. The governor will always be so constructed that the speed of the rakes will be reduced in greater ratio than the retardation of the cylinder 26ª, to the end that the latter may be quickly relieved from an overload. Again, if the quantity of grain fed between the jaws D E be sufficient to raise the upper jaw a corresponding reduction of speed of the lower rakes instantly ensues, owing to the friction-rollers 56 being drawn farther out on the disk 57, and thus again the rapidity of feed of the grain from the under side is reduced without any direct effect on the operation of the upper rakes D or the band-cutter. If the quantity of grain fed between the jaws D E be excessive, the friction-rollers 56 may be drawn completely off the disk 57, so that the lower rakes will be arrested altogether as well as the conveyer B. In this case the teeth of the lower rakes E will hold the lower portion or layer of grain immovable while the top layer is being carried forward by the upper rakes. If such interruption of movement of the lower rakes E occurs, it will be but momentary, since the upper rakes D will quickly remove the accumulated grain, and thus allow the hood 19 and shaft 20ª of the upper jaw to drop low enough to reëngage the friction-rollers 56 with the disk 57.

It will be understood that the casing or frame 1 of the band-cutter and feeder may have any preferred construction to adapt it for attachment to and use with the frame of a thresher of any particular make or kind.

It will be further understood that a single friction-roller 56 may be employed in place of two rollers in connection with the disk 57 for driving the lower rake E, although the double arrangement of rollers is preferable.

What I claim is—

1. In a grain-feeder, the combination, with a lower jaw of an upper jaw consisting of inverted rakes, a transverse rotary shaft whereon the rakes are pivoted so as to swing vertically, an inclosing frame in which the rakes are arranged, and which is also pivoted on the same shaft, a transverse shaft arranged counter to the first-named one and journaled in the said frame, and an elastic and adjustable suspension device connected with the free end of said frame, substantially as shown and for the purpose specified.

2. In a grain-feeder, the combination, with the upper jaw pivoted and adapted to swing vertically and the hood inclosing the same and pivoted on the same center, of rods connected with the hood at its free end and passing through a fixed portion of the casing, and springs and nuts applied to said rods, as and for the purpose specified.

3. In a grain-feeder, the combination, with the threshing-cylinder, a rotary band-cutter operatively connected therewith, an upper jaw comprising devices for moving the grain forward and rotary shafts for imparting motion thereto, of an automatic governor consisting of automatically-expansible pulleys and a belt connecting the same, the said pulleys being applied to the extended shafts of the band-cutter and the upper jaw, substantially as shown and described.

4. In a grain-feeder, the combination, with a threshing-cylinder, of a band-cutter operatively connected therewith, and an upper jaw comprising devices adapted to feed the grain forward, the band-cutter having an extended shaft which is feathered as described, and the jaw having an extended shaft provided with clutches which rotate therewith, of expansible pulleys applied to the respective shafts, the pulley of the band-shaft comprising two cones which are adapted to slide endwise but rotate therewith, a compression-spring interposed between the cones, a centrifugal-governor attachment adapted to draw the cones together corresponding to the speed of rotation, the opposite pulley being rotatable and also slidable on the jaw-shaft and provided with a governor attachment tending to draw the cones apart as the speed of rotation increases, clutches connected with the cones of the last-named pulley and adapted to engage the clutches fixed on the jaw-shaft, and levers which connect the cones of the respective pulleys, the same being pivoted at intermediate points so that the expansion of the driving-pulley effects reduction of the diameter of the opposite pulley, and duly engages the same with the shaft-clutches so that rotation is imparted from the driving-pulley to the jaw-shaft when the rate of speed suffices, substantially as shown and described.

5. In a grain-feeder, the combination, of the lower jaw comprising devices for feeding the grain forward and a rotary shaft imparting motion thereto and provided with a friction-disk, the upper jaw comprising devices for feeding the grain forward and a rotary shaft for imparting motion thereto, the said jaw being pivoted at its inner end and adapted to swing vertically at its outer end, a countershaft arranged at such outer end, and means for operatively connecting said shaft with the aforesaid friction-disk, the same comprising a rotary shaft which is geared with the jaw-shaft and provided at its opposite end with a friction-roller which is adapted to work in contact with the face of said disk and for adjustment toward and from the axis thereof according to the forward adjustment of the upper jaw, substantially as shown and described.

6. In a grain-feeder, the combination, with the lower jaw comprising a series of toothed bars and means for imparting vertical and endwise movement thereto the same consisting of parallel shafts one of which is provided with a friction-disk, of the upper jaw similarly composed of toothed bars and means for actuating them, the said bars being pivoted at their inner ends and adapted to swing vertically at their outer ends, a transverse counter-shaft arranged and operatively connected with their outer ends, and means for connecting such shaft with the shaft of the lower rakes, the same comprising parallel shafts having bevel-gears meshing with a corresponding gear on the upper rake-shaft, and friction-rollers applied to the lower ends of said shafts and engaging the disk of the lower rake-shaft, substantially as shown and described.

7. The combination with the upper jaw, having an extended driving-shaft provided with a double bevel-gear and the lower jaw having an extended driven shaft provided with a detachable disk, of a governor attachment comprising parallel shafts geared with the shaft of the upper jaw, two friction-rollers on said parallel shafts working on the faces of the said disk, and a device connected with the hubs of said rollers for adjusting the latter on their shafts, as and for the purpose specified.

8. The combination, with the upper jaw and its extended shaft provided with a gear and the lower jaw and its extended shaft provided with a friction-disk, of an interposed governor attachment comprising parallel shafts which are geared with the shaft of the upper jaw, and friction-rollers engaging the said disk, a bracket fixed to the frame in which the upper jaw is arranged, a movable bearing for one of said shafts, and means for adjusting said bearing toward and from the opposite shaft, for the purpose of varying the pressure of the friction-rollers on the disk, substantially as shown and described.

FRANK FREDEEN.

Witnesses:
   Geo. W. Seymour,
   A. R. Lowell.